(12) United States Patent
Akiyama et al.

(10) Patent No.: US 7,968,238 B2
(45) Date of Patent: Jun. 28, 2011

(54) METHOD FOR OPERATING FUEL CELL SYSTEM

(75) Inventors: Takashi Akiyama, Osaka (JP); Hideyuki Ueda, Osaka (JP); Toshihiko Ichinose, Nara (JP); Masahiro Takada, Shizuoka (JP)

(73) Assignee: Panasonic Corporation, Osaka (JP)

( * ) Notice: Subject to any disclaimer, the term of this patent is extended or adjusted under 35 U.S.C. 154(b) by 1070 days.

(21) Appl. No.: 11/752,559

(22) Filed: May 23, 2007

(65) Prior Publication Data

US 2007/0224468 A1     Sep. 27, 2007

(30) Foreign Application Priority Data

May 25, 2006     (JP) ................................. 2006-145582

(51) Int. Cl.
*H01M 8/04* (2006.01)
*H01M 8/00* (2006.01)

(52) U.S. Cl. ........................................ 429/428; 429/400
(58) Field of Classification Search .................. 429/400, 429/428
See application file for complete search history.

(56) References Cited

U.S. PATENT DOCUMENTS 4,532,192 A * 7/1985 Baker et al. .................... 429/411
2006/0188765 A1 * 8/2006 Matsuzaki et al. .............. 429/23

FOREIGN PATENT DOCUMENTS

JP      63026961         2/1988
JP      63026961 A   *   2/1988

* cited by examiner

*Primary Examiner* — Karie O'Neill Apicella
(74) *Attorney, Agent, or Firm* — Dickinson Wright PLLC

(57) ABSTRACT

A method for operating a fuel cell system including a fuel cell stack composed of a plurality of cells connected in series. The method includes the steps of: (a) supplying a fuel and an oxidant to anodes and cathodes of the cells, respectively, depending on a load to generate power at a constant voltage under constant voltage control; (b) temporarily suspending the supply of the oxidant with the fuel being supplied; and (c) lowering the constant voltage to a predetermined voltage simultaneously with or immediately before the suspension of the supply of the oxidant. According to this operation method, when the supply of the oxidant is suspended, a platinum catalyst in the cathodes can be reduced and reactivated in all the cells.

4 Claims, 3 Drawing Sheets

FIG. 3  "Prior art"
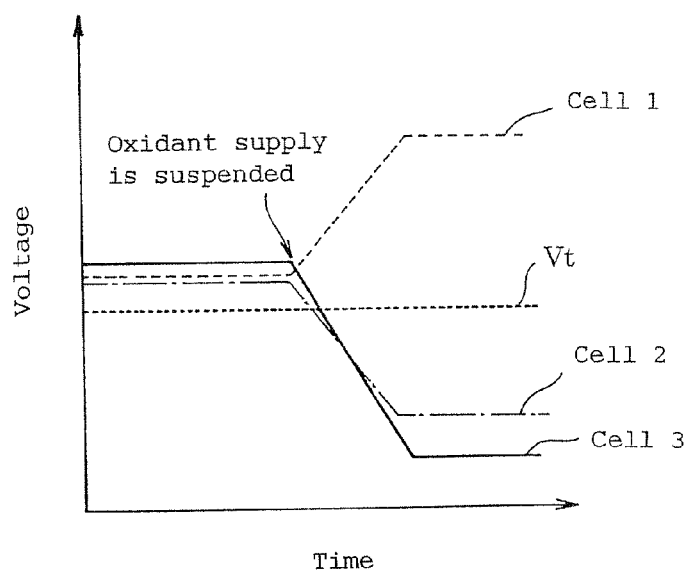
FIG. 4
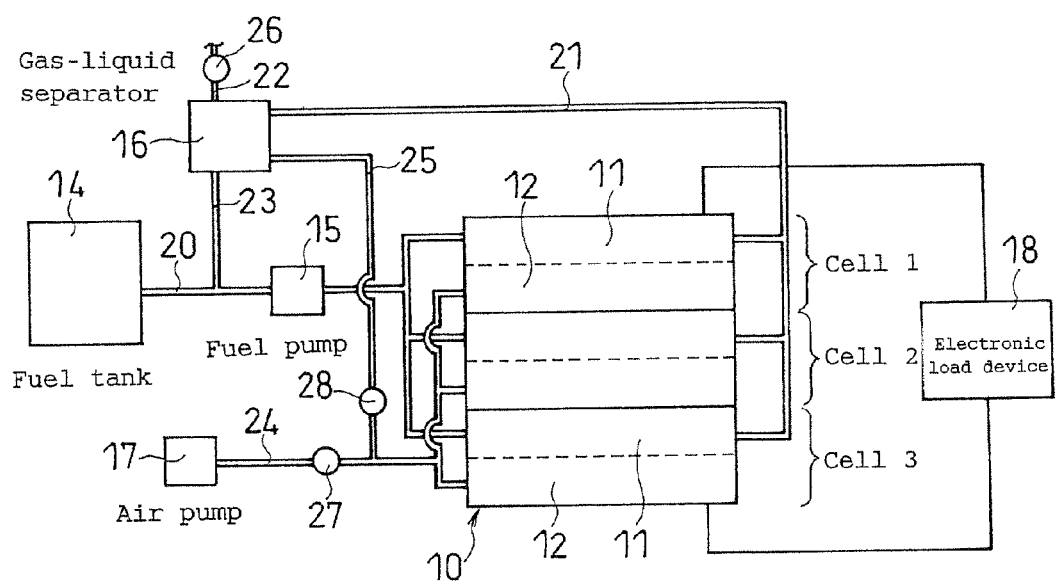

METHOD FOR OPERATING FUEL CELL SYSTEM

FIELD OF THE INVENTION

The present invention relates to methods for operating fuel cell systems, and, more particularly, to a method for operating a fuel cell system including a fuel cell stack under constant voltage control.

BACKGROUND OF THE INVENTION

When a fuel cell is in operation, the cathode has a relatively high potential of 0.6 V or more with respect to the normal hydrogen electrode (hereinafter referred to as NHE). When the operation is stopped (open circuit), the cathode has a high potential of 0.8 V or more. At such high potential, it is believed that the surface of a catalyst metal such as platinum in the cathode is oxidized and its active sites are decreased, thereby resulting in degradation of power generation performance.

To address this problem, Japanese Laid-Open Patent Publication No. Sho 63-26961 (hereinafter "JP-A 63-26961") proposes a method of operating a fuel cell system, in which an oxidant supply line is provided with a flow rate adjust valve and the supply of an oxidant is temporarily suspended with a fuel being supplied. When the oxidant supply is suspended, the oxidant concentration in the cathode lowers and the cathode potential promptly lowers, so that the surface of the platinum catalyst in the cathode is reduced and clear active sites are exposed. This is probably the reason of the voltage rise as shown in FIG. 2 of JP-A 63-26961, although there is no such statement in JP-A 63-26961.

The power generation of fuel cells is controlled by the constant current method in which the current is kept constant or the constant voltage method in which the voltage is controlled, and either one of the two methods is selected depending on the system configuration. In JP-A 63-26961, it appears that the power generation in a steady state is controlled by the constant current method.

According to the constant current method, when the oxidant supply is suspended, the concentration overvoltage rises due to the decrease in the oxidant concentration in the cathode, but the current is maintained constant. Hence, the cathode potential promptly lowers and the surface of the platinum catalyst in the cathode is reduced and reactivated. Even in the case of a fuel cell stack composed of a plurality of cells connected in series, the cathode potential lowers in all the cells, although there is a time lag among the cells.

However, if the total voltage of such a fuel cell stack is controlled by the constant voltage method, the following problem occurs upon the suspension of the oxidant supply. That is, in some cells, the cathode potential lowers and the voltage lowers, but in some other cells, the voltage rises so as to make up for the voltage drop of other cells.

This phenomenon probably results from the difference in cathode potential between cells in which a large amount of oxygen remains in the cathode and cells in which a small amount remains. Therefore, the cathode catalyst metal such as platinum is reactivated due to reduction in some cells, but not in other cells.

BRIEF SUMMARY OF THE INVENTION

The present invention relates to a fuel cell system including a fuel cell stack composed of a plurality of cells connected in series under constant voltage control and intends to reactivate a cathode catalyst metal due to reduction in all the cells when the oxidant supply is suspended.

The present invention is directed to a method for operating a fuel cell system. The fuel cell system includes: a fuel cell stack including a plurality of cells connected in series, each cell comprising an anode, a cathode, and an electrolyte membrane interposed between the anode and the cathode, the anode and the cathode each having a catalyst; and a fuel supply line for supplying a fuel to the anodes of the cells, and an oxidant supply line for supplying an oxidant to the cathodes. This method includes the steps of: (a) supplying the fuel and the oxidant to the anodes and the cathodes of the cells, respectively, depending on a load to generate power at a constant voltage under constant voltage control; (b) temporarily suspending the supply of the oxidant with the fuel being supplied; and (c) lowering the constant voltage to a predetermined voltage simultaneously with or immediately before the suspension of the supply of the oxidant.

In the step (c), the predetermined voltage is preferably a sufficiently low voltage to reduce and reactivate the catalyst of the cathode.

Preferably, the fuel cell system is a direct oxidation fuel cell system in which carbon dioxide is produced in the anodes as a reaction product, and simultaneously with or immediately before the suspension of the supply of the oxidant, the carbon dioxide discharged from the anodes is fed to the cathodes to promptly lower an oxygen concentration in the cathodes.

Further, it is also preferable to perform the step (b) and the step (c) (i.e., suspend the supply of the oxidant and lower the constant voltage) when the current density falls below a predetermined value.

In the operation method of a fuel cell according to the present invention, the set voltage of constant voltage control is lowered simultaneously with or immediately before the suspension of the oxidant supply. Thus, even when the voltage of one or more cells rises, it does not rise beyond the lowered set voltage, so that the catalyst metal in the cathode is reduced and reactivated in all the cells.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is a graph showing changes in voltage of cells of a fuel cell stack when the oxidant supply is suspended according to a conventional operation method;

FIG. 4 is a schematic view showing the structure of a fuel cell system used in another example of the present invention.

DETAILED DESCRIPTION OF THE INVENTION

Figure 1:
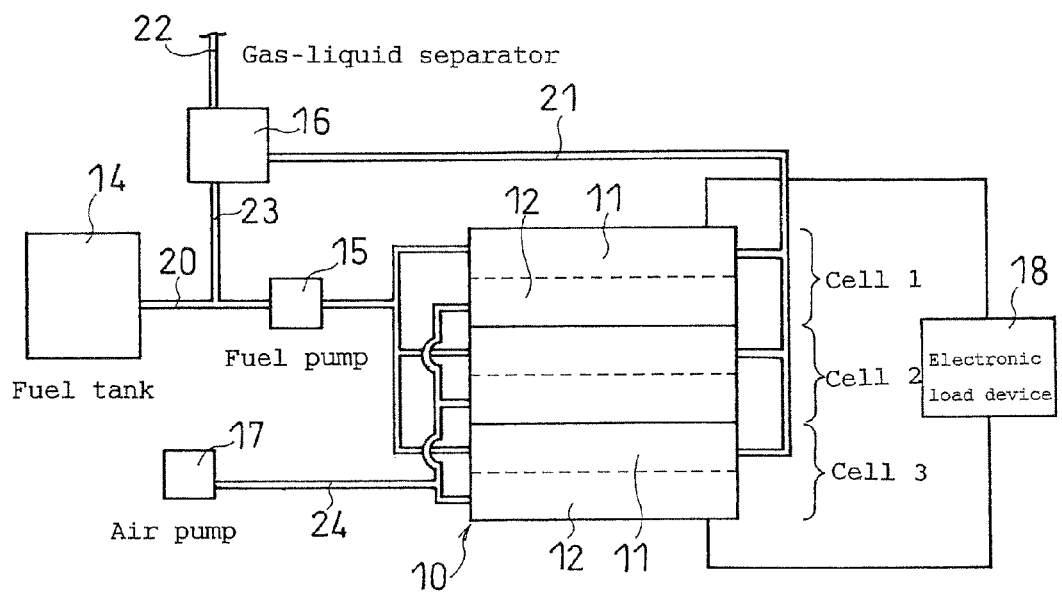
FIG. 1 is a schematic view showing the structure of a fuel cell system used in one example of the present invention.

According to the method for operating a fuel cell system of the present invention, simultaneously with or immediately before the suspension of the oxidant supply, the set voltage of constant voltage control is lowered.

The oxidant supply is suspended until the voltages of all the cells fall below a target voltage. As used herein, the target voltage refers to a voltage at which the cathode potential is 0.6 V or less vs NHE. It is believed that the catalyst is reduced and reactivated at such voltage.

The target voltage of each unit cell of the stack is explained by taking a direct methanol fuel cell (hereinafter referred to as a DMFC) as an example. In a typical DMFC, it is believed that the anode overvoltage is 0.2 to 0.3 V, although it depends on the polarization performance of the anode of the cell. Hence, the target cell voltage can be a value obtained by subtracting the anode overvoltage from 0.6 V, i.e., 0.3 to 0.4 V or less.

Next, the total voltage of the stack is explained. In order to ensure that the voltages of all the cells are 0.3 to 0.4 V or less, it is preferable to set the total voltage of the stack to 0.3 to 0.4 V. However, in the case of a stack of a large number of cells connected in series, if the total stack voltage is lowered, the current sharply increases, so that polarity reversal may occur in some cells whose electrode reaction cannot keep up with the sharp current increase.

In order to avoid this problem, it is important to minimize the time lag between the operation of lowering the total stack voltage and the operation of suspending the oxidant supply. While minimizing the time lag is one solution, another solution is to lower the total stack voltage in two stages. Specifically, in a first stage, the total stack voltage is lowered to a level at which polarity reversal does not occur, and in a second stage, while the air supply is suspended, the set voltage is lowered to a desired cell voltage. Also, the total stack voltage is not necessarily set to 0.3 to 0.4 V, and it may be set such that the cathode potential is 0.6 V or less vs NHE in all the cells.

With respect to the suspension time of the oxidant supply, several seconds can be sufficient. It is believed that the oxidation of the catalyst occurs only on the outermost surface of the particles, and that a reduction process of several seconds is sufficient to remove the stoichiometrical amount of the oxygen.

When the oxidant supply is suspended, the current promptly decreases, and it is preferable to resume the oxidant supply with a load connected (closed circuit), not with a load disconnected (open circuit). This is because fluctuation of cathode potential can promote catalyst deterioration.

In a preferable embodiment of the present invention, the fuel cell system is a direct oxidation fuel cell system in which carbon dioxide is produced in the anodes as a reaction product. Simultaneously with or immediately before the suspension of the oxidant supply, the carbon dioxide discharged from the anodes is fed to the cathodes to promptly lower the oxygen concentration in the cathodes.

According to this operation method, it is possible to reduce the difference in voltage between a cell whose voltage rises and a cell whose voltage lowers and to regenerate the catalytic activity more uniformly. As disclosed in JP-A 63-26961, it is known in the art to supply an inert gas such as nitrogen to eliminate oxygen remaining in the cathode. This operation method of the present invention utilizes the fact that carbon dioxide, which is an anode reaction product of a direct oxidation fuel cell, is basically inert toward the cathode reaction of the fuel cell. According to this method, a fuel cell system does not require a space for storing an inert gas.

In another preferable embodiment of the present invention, when the current density falls below a predetermined value, the oxidant supply is suspended and the set voltage of constant voltage control is lowered. When the oxidant supply is suspended under constant voltage control, the current decreases, i.e., the power generated by the fuel cell drops instantaneously. Hence, during the suspension of the oxidant supply, the fuel cell cannot serve as a power generator. It is therefore preferable to perform the operation of suspending the oxidant supply as effectively as possible and with least frequency.

To do this, according to the present invention, a threshold value of current density is set in advance, and only when the current density falls below the threshold value, the oxidant supply is suspended. The threshold value of current density is determined from the power the fuel cell system is required to generate for a device (power consumed by the device).

Examples of the present invention are hereinafter described more specifically with reference to drawings.

Example 1

FIG. 1 is a schematic view showing the structure of a fuel cell system in this example. A fuel cell 10 is a direct methanol fuel cell including a stack of three cells 1 to 3 that are connected in series. Methanol diluted with water is stored as a fuel in a fuel tank 14, and the fuel is supplied to anodes 11 therefrom through a fuel supply pipe 20 equipped with a fuel pump 15. Also, air, which contains oxygen, is used as an oxidant, and the oxidant is supplied to cathodes 12 through a supply pipe 24 by an air pump 17. A mixture of carbon dioxide and unused fuel discharged from the anodes is transported through a discharge pipe 21 to a gas-liquid separator 16, where gas and liquid are separated. From the gas-liquid separator 16, the carbon dioxide is discharged from the system through a pipe 22. The liquid containing the fuel is re-supplied to the fuel cell by the fuel pump 15 through a pipe 23 and the pipe 20. The stack of the cells 1 to 3 in series is under constant voltage control by an electronic load unit 18.

When the oxidant supply is suspended to reactivate the catalyst of the cathodes 12, as in a conventional operation method, for example, the voltages of the cells 2 and 3 lower, but the voltage of the cell 1 rises so as to make up for the voltage drop since these cells are under constant voltage control, as shown in FIG. 3.

Figure 2:
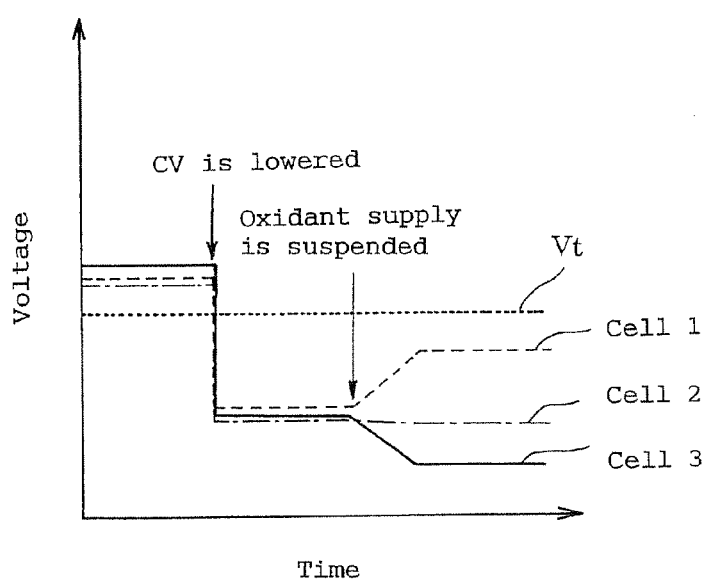
FIG. 2 is a graph showing changes in voltage of cells of a fuel cell stack when the oxidant supply is suspended according to an operation method in one example of the present invention.

Even in the case of the operation method of the present invention, the voltage varies among the cells after the suspension of the oxidant supply. However, as shown in FIG. 2, even if the voltage of, for example, the cell 1 rises, it does not rise beyond a threshold value (Vt) for catalyst reduction/reactivation, since the constant voltage control value (CV) is lowered before the suspension of the oxidant supply.

Example 2

FIG. 4 is a schematic view showing the structure of a fuel cell system in this example, in which the same elements as those of FIG. 1 are given the same numbers and their explanations are omitted.

In this example, a pipe 25 is provided to transport the carbon dioxide from the gas-liquid separator 16 to the air supply pipe 24, and the pipes 22, 24, and 25 are provided with valves 26, 27, and 28.

In a steady operation, the valve 26 is open and the carbon dioxide is discharged from the system. During or before the suspension of the air supply, the valve 26 is closed and the carbon dioxide discharged from the anodes is stored in the gas-liquid separator 16. Simultaneously with or immediately after the suspension of the air supply, the valve 27 is closed to prevent the carbon dioxide from leaking toward the air pump 17, and the valve 28 is promptly opened to supply the carbon dioxide to the cathodes.

Figure 5:
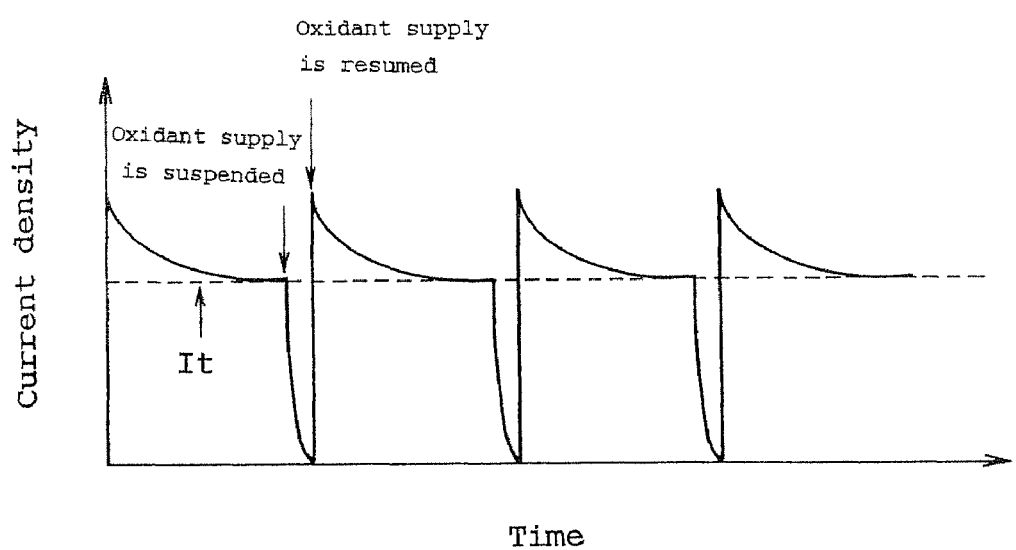
FIG. 5 is a graph showing changes in current density of a fuel cell stack when the oxidant supply is suspended and resumed according to an operation method in another example of the present invention.

FIG. 5 shows changes in current density of the fuel cell when the oxidant supply is suspended and resumed according to the operation method of this example. As shown in FIG. 5, a threshold value (It) of current density is set, and when the current density falls below the threshold value, the oxidant supply is suspended in the manner as described above. Specifically, simultaneously with or immediately after the suspension of the air supply, the valve 27 is closed and the valve 28 is promptly opened to supply the carbon dioxide in the gas-liquid separator 16 to the cathodes through the pipes 25 and 24. It should be noted that the suspension time of the oxidant supply as illustrated in FIG. 5 is enlarged. Preferably, the time for the current density of the fuel cell to reach the threshold value is several minutes to tens of minutes and the suspension time of the oxidant supply is several seconds.

The fuel cell of the present invention is useful as the power source for portable small-sized electronic devices, such as cellular phones, personal digital assistants (PDAs), notebook PCs, and video cameras. It is also applicable to domestic power generators, automobile power sources, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for operating a fuel cell system,
the fuel cell system comprising:
a fuel cell stack comprising a plurality of cells connected in series, each cell comprising an anode, a cathode, and an electrolyte membrane interposed between the anode and the cathode, the anode and the cathode each having a catalyst; and
a fuel supply line for supplying a fuel to the anodes of the cells, and an oxidant supply line for supplying an oxidant to the cathodes,
the method comprising the steps of:
(a) supplying the fuel and the oxidant to the anodes and the cathodes of the cells, respectively, depending on a load to generate power at a constant voltage under constant voltage control;
(b) temporarily suspending the supply of the oxidant with the fuel being supplied; and
(c) lowering the constant voltage to a predetermined voltage simultaneously with or immediately before the suspension of the supply of the oxidant,
wherein in the step (c), the predetermined voltage is a sufficiently low voltage to reduce and reactivate the catalyst of the cathode in all the cells.

2. The method for operating a fuel cell system in accordance with claim 1,
wherein the fuel cell system is a direct oxidation fuel cell system in which carbon dioxide is produced in the anodes as a reaction product, and
simultaneously with or immediately before the suspension of the supply of the oxidant, the carbon dioxide discharged from the anodes is fed to the cathodes to promptly lower an oxygen concentration in the cathodes.

3. The method for operating a fuel cell system in accordance with claim 1, wherein the step (b) and the step (c) are performed when a current density falls below a predetermined value.

4. The method for operating a fuel cell system in accordance with claim 1, wherein said predetermined voltage is a voltage at which the cathodes of all the cells have a potential of 0.6 V vs the normal hydrogen electrode.

* * * * *